(12) United States Patent
Weitermann et al.

(10) Patent No.: US 7,483,840 B2
(45) Date of Patent: Jan. 27, 2009

(54) RANDOMIZED COMPETITIVE INSURANCE PRICING SYSTEM AND METHOD

(75) Inventors: Michael Frederick Weitermann, Menomonee Falls, WI (US); Lisa Marie Mrochinski, Campbellsport, WI (US)

(73) Assignee: Atera Solutions LLC, Menonomonee Falls, WI (US)

( * ) Notice: Subject to any disclaimer, the term of this patent is extended or adjusted under 35 U.S.C. 154(b) by 1137 days.

(21) Appl. No.: 10/227,102

(22) Filed: Aug. 23, 2002

(65) Prior Publication Data

US 2004/0039610 A1  Feb. 26, 2004

(51) Int. Cl.
*G06Q 40/00* (2006.01)

(52) U.S. Cl. ......................................................... 705/4
(58) Field of Classification Search .................. 705/2–4
See application file for complete search history.

(56) References Cited

U.S. PATENT DOCUMENTS

| | | | |
|---|---|---|---|
| 4,831,526 A | 5/1989 | Luchs et al. | |
| 4,975,840 A | 12/1990 | DeTore et al. | |
| 5,414,836 A * | 5/1995 | Baer et al. | 714/38 |
| 5,479,344 A | 12/1995 | Keziah, Jr. | |
| 5,523,942 A | 6/1996 | Tyler et al. | |
| 5,655,085 A | 8/1997 | Ryan et al. | |
| 5,758,328 A | 5/1998 | Giovannoli | |
| 5,842,178 A | 11/1998 | Giovannoli | |
| 5,873,066 A | 2/1999 | Underwood et al. | |
| 5,956,691 A | 9/1999 | Powers | |
| 5,970,464 A | 10/1999 | Apte et al. | |
| 6,009,402 A | 12/1999 | Whitworth | |
| 6,163,770 A | 12/2000 | Gamble et al. | |
| 6,182,048 B1 | 1/2001 | Osborn et al. | |
| 6,490,645 B1 * | 12/2002 | Shahaf et al. | 710/244 |
| 6,772,128 B2 * | 8/2004 | Radigan | 705/4 |
| 2001/0023404 A1 * | 9/2001 | Ogawa et al. | 705/4 |

FOREIGN PATENT DOCUMENTS

| | | | |
|---|---|---|---|
| JP | 10228462 A | * | 8/1998 |
| JP | H10-228462 | | 8/1998 |

* cited by examiner

*Primary Examiner*—C Luke Gilligan
*Assistant Examiner*—Sheetal R Rangrej
(74) *Attorney, Agent, or Firm*—Michael Best & Friedrich LLP

(57) ABSTRACT

A system and method of generating insurance risk samples and for comparing hypothetical and real insurance premiums of different insurance companies is disclosed. In some embodiments, one or more rating factors are defined and have a plurality of possible values at least partially defining an insurance risk. By generating random numbers that are used to select the values of these parameters, a user can generate sample risks, calculate sample premiums for the risks, and/or compare sample premiums for different types of insurance policies.

9 Claims, 14 Drawing Sheets

XYZ Mutual: Current Base Rates
State: Wisconsin

| Territory | Regular Program | | | | | | High Risk Program | | | | | |
|---|---|---|---|---|---|---|---|---|---|---|---|---|
| | CSL | BI | PD | MedPay | Comp | Collision | CSL | BI | PD | MedPay | Comp | Collision |
| | 25 | 25/50 | 10 | 1000 | $100 Ded | $250 Ded | 25 | 25/50 | 10 | 1000 | $100 Ded | $250 Ded |
| 2 | 93 | 60 | 26 | 5 | 19 | 67 | 150 | 101 | 43 | 8 | 32 | 112 |
| 3 | 91 | 59 | 26 | 5 | 16 | 70 | 148 | 98 | 43 | 8 | 27 | 117 |
| 4 | 73 | 47 | 19 | 4 | 25 | 76 | 117 | 78 | 32 | 7 | 42 | 127 |
| 5 | 59 | 32 | 21 | 4 | 14 | 50 | 94 | 52 | 34 | 7 | 23 | 85 |
| 6 | 55 | 30 | 18 | 4 | 22 | 47 | 87 | 50 | 31 | 7 | 36 | 79 |
| 7 | 61 | 39 | 16 | 4 | 15 | 52 | 98 | 64 | 27 | 7 | 26 | 86 |
| 8 | 50 | 26 | 15 | 4 | 14 | 47 | 77 | 44 | 26 | 7 | 23 | 78 |
| 9 | 55 | 32 | 15 | 4 | 23 | 59 | 86 | 53 | 26 | 7 | 37 | 100 |
| 10 | 61 | 31 | 23 | 4 | 20 | 50 | 98 | 51 | 40 | 7 | 32 | 85 |
| 11 | 65 | 37 | 21 | 4 | 21 | 54 | 104 | 61 | 35 | 7 | 34 | 90 |
| 12 | 75 | 43 | 25 | 4 | 22 | 59 | 121 | 72 | 41 | 7 | 36 | 98 |
| 13 | 122 | 75 | 41 | 6 | 30 | 88 | 200 | 125 | 68 | 10 | 50 | 148 |
| 14 | 86 | 57 | 23 | 5 | 15 | 68 | 140 | 95 | 38 | 8 | 26 | 114 |
| 15 | 64 | 40 | 18 | 4 | 24 | 54 | 103 | 66 | 30 | 7 | 41 | 90 |
| 17 | 60 | 34 | 19 | 4 | 18 | 52 | 95 | 57 | 32 | 7 | 30 | 87 |

BaseRates | UmUim | RateFactors | Primary | Secondary | ModelYr/SymRel | Discounts

FIG. 2

| Vehicle 1 Premiums: | | | | | | | | | | |
|---|---|---|---|---|---|---|---|---|---|---|
| | Acuity | Alst | Amfam | CNA | GC | Secura | Stfm | WBMI | Current | Propose | % |
| | Acuity2 | AlstInsCo | Mutual | Platinum | Ultra | Milestone | Mutual | Elite | Regular | Regular | |
| Coverage | 04/01/02 | 02/01/02 | 09/13/01 | 05/15/01 | 03/01/02 | 02/08/02 | 06/15/00 | 11/15/01 | 01/01/01 | 01/01/01 | Change |
| Bi | 62 | 129 | 0 | 121 | 132 | 57 | 0 | 74 | 75 | 75 | 0.0% |
| Pd | 40 | 57 | 0 | 34 | 53 | 34 | 0 | 49 | 29 | 29 | 0.0% |
| Bi/Pd | 102 | 186 | 93 | 155 | 185 | 91 | 133 | 123 | 104 | 104 | 0.0% |
| MedPay | 6 | 8 | 4 | 10 | 9 | 12 | 6 | 7 | 7 | 7 | 0.0% |
| Um | 9 | 9 | 11 | 27 | 21 | 37 | 31 | 13 | 32 | 32 | 0.0% |
| Uim | 10 | 17 | 8 | 14 | 15 | 21 | 24 | 14 | 20 | 20 | 0.0% |
| Comp | 90 | 87 | 45 | 94 | 115 | 0 | 60 | 82 | 53 | 53 | 0.0% |
| Collision | 86 | 132 | 76 | 94 | 118 | 55 | 90 | 111 | 86 | 86 | 0.0% |
| Total | 303 | 439 | 237 | 514 | 463 | 216 | 344 | 350 | 302 | 302 | 0.0% |
| Rank | (5) | (8) | (2) | (10) | (9) | (1) | (6) | (7) | (3) | (3) | |

| Vehicle 2 Premiums: | | | | | | | | | | |
|---|---|---|---|---|---|---|---|---|---|---|
| | Acuity | Alst | Amfam | CNA | GC | Secura | Stfm | WBMI | Current | Propose | % |
| | Acuity2 | AlstInsCo | Mutual | Platinum | Ultra | Milestone | Mutual | Elite | Regular | Regular | |
| Coverage | 04/01/02 | 02/01/02 | 09/13/01 | 05/15/01 | 03/01/02 | 02/08/02 | 06/15/00 | 11/15/01 | 01/01/01 | 01/01/01 | Change |
| Bi | 68 | 148 | 0 | 113 | 128 | 63 | 0 | 78 | 75 | 75 | 0.0% |
| Pd | 44 | 65 | 0 | 32 | 51 | 37 | 0 | 51 | 29 | 29 | 0.0% |
| Bi/Pd | 112 | 213 | 110 | 145 | 179 | 100 | 164 | 129 | 104 | 104 | 0.0% |
| MedPay | 6 | 11 | 5 | 9 | 8 | 12 | 8 | 8 | 7 | 7 | 0.0% |
| Um | 9 | 8 | 11 | 27 | 21 | 37 | 31 | 13 | 32 | 32 | 0.0% |
| Uim | 10 | 16 | 8 | 14 | 15 | 21 | 24 | 14 | 20 | 20 | 0.0% |
| Comp | 22 | 31 | 23 | 24 | 26 | 48 | 32 | 25 | 19 | 19 | 0.0% |
| Collision | 68 | 123 | 78 | 144 | 69 | 45 | 101 | 84 | 69 | 69 | 0.0% |
| Total | 227 | 402 | 235 | 363 | 318 | 263 | 360 | 273 | 251 | 251 | 0.0% |
| Rank | (1) | (10) | (2) | (9) | (7) | (5) | (8) | (6) | (3) | (3) | |

Rate | Random

*FIG. 4C*

VehicleFactors:

| Coverage | Acuity | Alst | Amfam | CNA | GC | Secura | Stfm | WBMI | Current | Propose | % Change |
|---|---|---|---|---|---|---|---|---|---|---|---|
| Bi-Veh1 | 0.98 | 1.71 | 0.00 | 1.68 | 0.94 | 0.53 | 0.00 | 1.03 | 1.00 | 1.00 | 0.0% |
| Bi-Veh2 | 0.91 | 1.67 | 0.00 | 1.55 | 0.95 | 0.50 | 0.00 | 0.91 | 1.00 | 1.00 | 0.0% |
| Bi-Veh3 | 0.91 | 1.50 | 0.00 | 1.55 | 0.95 | 0.50 | 0.00 | 0.87 | 1.00 | 1.00 | 0.0% |
| Bi-Veh4 | 1.07 | 1.78 | 0.00 | 1.68 | 3.12 | 0.77 | 0.00 | 0.83 | 1.00 | 1.00 | 0.0% |
| Bi-Total | 0.98 | 1.68 | 0.00 | 1.62 | 1.72 | 0.60 | 0.00 | 0.90 | 1.00 | 1.00 | 0.0% |
| | | | | | | | | | | | |
| Pd-Veh1 | 1.33 | 2.00 | 0.00 | 1.44 | 0.96 | 0.78 | 0.00 | 1.93 | 1.00 | 1.00 | 0.0% |
| Pd-Veh2 | 1.25 | 1.94 | 0.00 | 1.31 | 0.97 | 0.72 | 0.00 | 1.69 | 1.00 | 1.00 | 0.0% |
| Pd-Veh3 | 1.25 | 1.75 | 0.00 | 1.31 | 0.97 | 0.72 | 0.00 | 1.63 | 1.00 | 1.00 | 0.0% |
| Pd-Veh4 | 1.46 | 2.10 | 0.00 | 1.44 | 2.28 | 1.10 | 0.00 | 1.56 | 1.00 | 1.00 | 0.0% |
| Pd-Total | 1.34 | 1.96 | 0.00 | 1.38 | 1.43 | 0.87 | 0.00 | 1.67 | 1.00 | 1.00 | 0.0% |
| | | | | | | | | | | | |
| Bi/Pd-Veh1 | 1.09 | 1.80 | 1.39 | 1.61 | 0.95 | 0.60 | 1.42 | 1.29 | 1.00 | 1.00 | 0.0% |
| Bi/Pd-Veh2 | 1.01 | 1.75 | 1.38 | 1.48 | 0.95 | 0.56 | 1.48 | 1.14 | 1.00 | 1.00 | 0.0% |
| Bi/Pd-Veh3 | 1.01 | 1.57 | 1.38 | 1.48 | 0.95 | 0.56 | 1.41 | 1.09 | 1.00 | 1.00 | 0.0% |
| Bi/Pd-Veh4 | 1.18 | 1.87 | 1.66 | 1.61 | 2.88 | 0.87 | 1.52 | 1.04 | 1.00 | 1.00 | 0.0% |
| Bi/Pd-Total | 1.08 | 1.76 | 1.48 | 1.55 | 1.64 | 0.68 | 1.47 | 1.12 | 1.00 | 1.00 | 0.0% |
| | | | | | | | | | | | |
| MedPay-Veh1 | 1.00 | 1.17 | 1.33 | 1.17 | 0.83 | 2.00 | 1.17 | 2.00 | 1.00 | 1.00 | 0.0% |
| MedPay-Veh2 | 1.00 | 2.00 | 1.43 | 1.14 | 1.00 | 1.71 | 1.43 | 1.71 | 1.00 | 1.00 | 0.0% |
| MedPay-Veh3 | 1.00 | 1.71 | 1.43 | 1.14 | 0.86 | 1.71 | 1.14 | 1.71 | 1.00 | 1.00 | 0.0% |
| MedPay-Veh4 | 1.18 | 2.09 | 2.09 | 1.27 | 1.73 | 1.55 | 1.82 | 1.64 | 1.00 | 1.00 | 0.0% |
| MedPay-Total | 1.06 | 1.81 | 1.65 | 1.19 | 0.90 | 1.71 | 1.45 | 1.74 | 1.00 | 1.00 | 0.0% |
| | | | | | | | | | | | |
| Um-Veh1 | 0.31 | 0.66 | 0.34 | 0.44 | 0.66 | 0.84 | 0.47 | 0.31 | 1.00 | 1.00 | 0.0% |
| Um-Veh2 | 0.31 | 0.59 | 0.34 | 0.44 | 0.66 | 0.84 | 0.47 | 0.31 | 1.00 | 1.00 | 0.0% |
| Um-Veh3 | 0.31 | 0.59 | 0.34 | 0.44 | 0.66 | 0.84 | 0.47 | 0.31 | 1.00 | 1.00 | 0.0% |
| Um-Veh4 | 0.34 | 0.59 | 0.41 | 0.44 | 1.63 | 0.84 | 0.47 | 0.31 | 1.00 | 1.00 | 0.0% |
| Um-Total | 0.32 | 0.61 | 0.36 | 0.44 | 0.90 | 0.84 | 0.47 | 0.31 | 1.00 | 1.00 | 0.0% |

Rate | Random

XYZ Mutual - Wisconsin
Randomization Results

Average Total Premiums:

| Coverage | Acuity | Alst | Amfam | CNA | GC | Secura | Stfm | WBMI | Current | Propose | Change |
|---|---|---|---|---|---|---|---|---|---|---|---|
| Bi | 400 | 450 | 0 | 466 | 644 | 291 | 0 | 350 | 372 | 390 | 4.7% |
| Pd | 243 | 243 | 0 | 149 | 286 | 157 | 0 | 235 | 165 | 172 | 4.4% |
| Bi/Pd | 644 | 693 | 537 | 615 | 930 | 448 | 523 | 586 | 538 | 562 | 4.6% |
| MedPay | 38 | 55 | 47 | 37 | 39 | 55 | 49 | 56 | 39 | 39 | 0.0% |
| Um | 39 | 67 | 35 | 49 | 81 | 116 | 53 | 41 | 115 | 115 | 0.0% |
| Uim | 38 | 20 | 25 | 16 | 56 | 0 | 32 | 24 | 62 | 62 | 0.0% |
| Comp | 199 | 209 | 137 | 104 | 230 | 306 | 142 | 153 | 144 | 144 | 0.0% |
| Collision | 527 | 610 | 415 | 562 | 567 | 308 | 371 | 439 | 416 | 416 | 0.0% |
| Total | 1485 | 1654 | 1197 | 1382 | 1903 | 1234 | 1169 | 1299 | 1313 | 1338 | 1.9% |
| Rank | (8) | (9) | (2) | (7) | (10) | (3) | (1) | (4) | (5) | (6) | |

Average Vehicle 1 Premiums:

| Coverage | Acuity | Alst | Amfam | CNA | GC | Secura | Stfm | WBMI | Current | Propose | Change |
|---|---|---|---|---|---|---|---|---|---|---|---|
| Bi | 106 | 122 | 0 | 126 | 156 | 68 | 0 | 89 | 96 | 101 | 4.7% |
| Pd | 65 | 66 | 0 | 42 | 70 | 49 | 0 | 60 | 43 | 45 | 4.4% |
| Bi/Pd | 171 | 188 | 145 | 168 | 226 | 116 | 139 | 149 | 140 | 146 | 4.6% |
| MedPay | 10 | 14 | 13 | 10 | 9 | 14 | 13 | 14 | 10 | 10 | 0.0% |
| Um | 10 | 18 | 9 | 12 | 20 | 29 | 13 | 10 | 29 | 29 | 0.0% |
| Uim | 10 | 5 | 6 | 4 | 14 | 0 | 8 | 6 | 15 | 15 | 0.0% |
| Comp | 61 | 62 | 42 | 33 | 70 | 84 | 43 | 45 | 44 | 44 | 0.0% |
| Collision | 153 | 178 | 125 | 173 | 153 | 94 | 109 | 124 | 120 | 120 | 0.0% |
| Total | 414 | 466 | 340 | 400 | 493 | 338 | 326 | 348 | 358 | 365 | 1.8% |
| Rank | (8) | (9) | (3) | (7) | (10) | (2) | (1) | (4) | (5) | (6) | |

*FIG. 7A*

| VehicleFactors: | | | | | | | | | | | |
|---|---|---|---|---|---|---|---|---|---|---|---|
| Coverage | Acuity | Alst | Amfam | CNA | GC | Secura | Stfm | WBMI | Current | Propose | % Change |
| Bi-Veh1 | 1.10 | 1.27 | 0.00 | 1.30 | 1.62 | 0.70 | 0.00 | 0.92 | 1.00 | 1.05 | 4.7% |
| Bi-Veh2 | 1.06 | 1.19 | 0.00 | 1.28 | 1.70 | 0.81 | 0.00 | 0.93 | 1.00 | 1.04 | 4.5% |
| Bi-Veh3 | 1.05 | 1.19 | 0.00 | 1.21 | 1.95 | 0.72 | 0.00 | 0.97 | 1.00 | 1.05 | 5.1% |
| Bi-Veh4 | 1.09 | 1.18 | 0.00 | 1.21 | 1.65 | 0.90 | 0.00 | 0.94 | 1.00 | 1.05 | 4.6% |
| Bi-Total | 1.08 | 1.21 | 0.00 | 1.25 | 1.73 | 0.78 | 0.00 | 0.94 | 1.00 | 1.05 | 4.7% |
|  |  |  |  |  |  |  |  |  |  |  |  |
| Pd-Veh1 | 1.50 | 1.52 | 0.00 | 0.98 | 1.63 | 1.12 | 0.00 | 1.39 | 1.00 | 1.04 | 4.4% |
| Pd-Veh2 | 1.46 | 1.45 | 0.00 | 0.91 | 1.73 | 0.96 | 0.00 | 1.41 | 1.00 | 1.04 | 3.7% |
| Pd-Veh3 | 1.45 | 1.47 | 0.00 | 0.84 | 1.90 | 0.87 | 0.00 | 1.47 | 1.00 | 1.05 | 4.7% |
| Pd-Veh4 | 1.49 | 1.43 | 0.00 | 0.88 | 1.68 | 0.86 | 0.00 | 1.43 | 1.00 | 1.05 | 4.6% |
| Pd-Total | 1.47 | 1.47 | 0.00 | 0.90 | 1.73 | 0.95 | 0.00 | 1.43 | 1.00 | 1.04 | 4.4% |
|  |  |  |  |  |  |  |  |  |  |  |  |
| Bi/Pd-Veh1 | 1.22 | 1.35 | 1.04 | 1.20 | 1.62 | 0.83 | 0.99 | 1.07 | 1.00 | 1.05 | 4.6% |
| Bi/Pd-Veh2 | 1.18 | 1.27 | 0.98 | 1.16 | 1.71 | 0.85 | 0.97 | 1.08 | 1.00 | 1.04 | 4.2% |
| Bi/Pd-Veh3 | 1.17 | 1.28 | 1.01 | 1.10 | 1.94 | 0.76 | 0.96 | 1.12 | 1.00 | 1.05 | 5.0% |
| Bi/Pd-Veh4 | 1.21 | 1.26 | 0.97 | 1.11 | 1.66 | 0.88 | 0.96 | 1.09 | 1.00 | 1.05 | 4.6% |
| Bi/Pd-Total | 1.20 | 1.29 | 1.00 | 1.14 | 1.73 | 0.83 | 0.97 | 1.09 | 1.00 | 1.05 | 4.6% |
|  |  |  |  |  |  |  |  |  |  |  |  |
| MedPay-Veh1 | 0.99 | 1.40 | 1.27 | 0.99 | 0.91 | 1.39 | 1.26 | 1.39 | 1.00 | 1.00 | 0.0% |
| MedPay-Veh2 | 0.97 | 1.45 | 1.19 | 0.96 | 1.04 | 1.41 | 1.27 | 1.38 | 1.00 | 1.00 | 0.0% |
| MedPay-Veh3 | 0.94 | 1.37 | 1.20 | 0.88 | 1.02 | 1.41 | 1.22 | 1.45 | 1.00 | 1.00 | 0.0% |
| MedPay-Veh4 | 0.99 | 1.42 | 1.17 | 0.92 | 0.97 | 1.42 | 1.23 | 1.43 | 1.00 | 1.00 | 0.0% |
| MedPay-Total | 0.97 | 1.41 | 1.21 | 0.94 | 0.99 | 1.41 | 1.24 | 1.41 | 1.00 | 1.00 | 0.0% |
|  |  |  |  |  |  |  |  |  |  |  |  |
| Um-Veh1 | 0.34 | 0.64 | 0.31 | 0.42 | 0.71 | 1.01 | 0.46 | 0.36 | 1.00 | 1.00 | 0.0% |
| Um-Veh2 | 0.34 | 0.57 | 0.31 | 0.42 | 0.71 | 1.01 | 0.46 | 0.36 | 1.00 | 1.00 | 0.0% |
| Um-Veh3 | 0.33 | 0.57 | 0.30 | 0.42 | 0.74 | 1.01 | 0.46 | 0.36 | 1.00 | 1.00 | 0.0% |
| Um-Veh4 | 0.34 | 0.57 | 0.30 | 0.42 | 0.68 | 1.01 | 0.46 | 0.36 | 1.00 | 1.00 | 0.0% |
| Um-Total | 0.34 | 0.58 | 0.31 | 0.42 | 0.71 | 1.01 | 0.46 | 0.36 | 1.00 | 1.00 | 0.0% |

← 132    ← 615

Rate    Random

FIG. 7B

RANDOMIZED COMPETITIVE INSURANCE PRICING SYSTEM AND METHOD

BACKGROUND OF THE INVENTION

Insurance rate software applications exist for allowing users to research current or future insurance rates or premiums based upon current or past insurance rate information. These applications generally prompt a user or database for an input of data, and display analysis results. However, the results provided by these applications often only provide limited strategic information (i.e., information upon which decisions can be made regarding a user's insurance rates and premiums). As a result, data manipulation, extrapolation, and estimation are typically necessary. For example, a user may wish to determine what effect, if any, will result when a change is made in one or more factors used to determine the user's insurance premiums offered to the user's customers.

Without knowing how such a change will affect the user's offered premiums, it can be difficult to determine the user's position in the marketplace (e.g., whether the resulting premiums would be too expensive compared to other insurance providers or too far below market value). To determine the impact of the change, the user can apply the change to existing policies in the user's portfolio, or can prepare one or more sample policies based upon sample risks. However, the application of the change to existing policies can take a great amount of time and effort, and may not reflect the true impact such a change can have on future business of the user. In addition, the process of developing sample policies and sample risks can be both complicated and time consuming.

In either case, the results of such a change to a user's insurance policies will need to be compared to similar policies offered by other insurance providers. Depending upon the number of other insurance providers selected for this comparison, the amount of work needed to generate useful comparison data can be tremendous. In addition, it is often difficult to manipulate data for purposes of comparison because every insurance provider uses different bases and different insurance rating factors to determine their premiums.

SUMMARY OF THE INVENTION

In some embodiments, the invention provides a system for determining insurance premiums. The system can include a user interface screen upon which at least one rating factor used to calculate insurance premiums is displayed. The rating factors can each have at least two rating elements defining possible values of the rating factors. Random numbers generated by a processor can be used by a rate comparison module to select at least one of the rating elements corresponding to the random numbers, thereby at least partially defining a hypothetical risk for which one or more insurance premiums can be calculated. In some cases, the rate comparison module is further adapted to calculate and display one or more premiums covering the risk based upon the at least one rating element.

In other embodiments, the present invention provides a method of comparing insurance premiums of at least two insurance companies. The method can include: providing a rating factor at least partially defining a risk, wherein the rating factor has at least two possible values, generating a random number via a processor, identifying at least one of the possible rating factor values corresponding to the random number generated by the processor, retrieving premium calculation data of a first insurance provider from a memory coupled to the processor, and calculating a premium of the first insurance provider. The premium of the first insurance provider can be at least partially based upon the premium calculation data of the first insurance provider and the at least one possible rating factor value. The method can further include retrieving premium calculation data of a second insurance provider from a memory coupled to the processor, and calculating a premium of the second insurance provider. The premium of the second insurance provider can be at least partially based upon the premium calculation data of the second insurance provider and the at least one possible rating factor value.

The invention also provides a method of generating sample insurance risks for use in comparing insurance company premiums. In some embodiments, the method includes defining an insurance rating factor having at least two possible values, displaying the insurance rating factor on a user interface screen, generating a random number via a processor, identifying a value of the insurance rating factor corresponding to the random number generated by the processor, and assigning the value identified to a sample insurance risk in order to at least partially generate the sample insurance risk.

Other features and advantages of the invention will become apparent by consideration of the detailed description and accompanying drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements, combinations of elements, and acts described below and illustrated in the drawings can be arranged and organized differently to result in embodiments which are still within the spirit and scope of the present invention.

In the drawings, wherein like reference numerals indicate like parts:

FIG. 2 is a current values user interface screen for the insurance rate comparison system illustrated in FIG. 1;

FIG. 4C is another portion of the rate comparison user interface screen illustrated in FIG. 4A, showing the premium data for two of the four vehicles in FIG. 4B;

FIG. 4D is another portion of the rate comparison user interface screen illustrated in FIG. 4A, showing different insurance carriers' premiums as factors of the current premium illustrated in FIGS. 4B and 4C;

FIG. 6 is the randomization interface screen of the rate comparison module illustrated in FIG. 5, shown prior to execution of a randomization routine;

FIG. 7A is another randomization interface screen of the rate comparison module illustrated in FIG. 5 following execution of a randomization routine, shown with premium values calculated in a randomization routine;

FIG. 7B is another portion of the randomization interface screen illustrated in FIG. 7A, showing different insurance carriers' premiums as factors of the current premium illustrated in FIG. 7A;

Before any embodiments of the invention are explained in detail, it is to be understood that the invention is not limited in its application to the details of construction, the arrangement of components, and the order of acts set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

DETAILED DESCRIPTION OF THE EMBODIMENT

Figure 1:
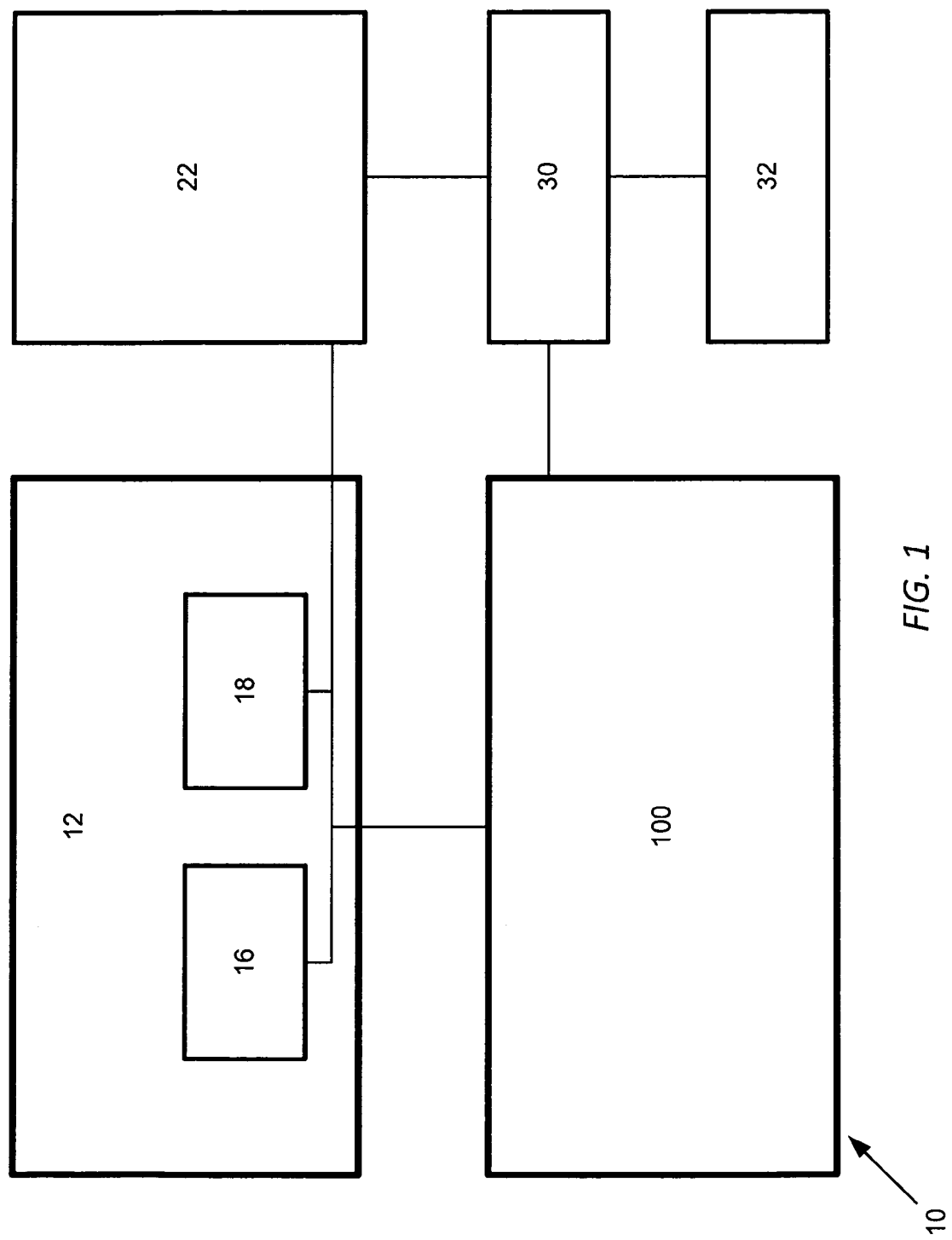
FIG. 1 is a schematic view of an insurance rate comparison system according to an embodiment of the present invention.

A system for comparing insurance rates (such as insurance rates of different insurance providers) is illustrated in FIG. 1, and is indicated generally at 10. The system 10 according to an exemplary embodiment of the present invention includes a user insurance values and interface module 12 and a rate comparison module 100 (both of which can operate upon a spreadsheet-based application or in any other application capable of displaying entered and calculated data). These modules need not necessarily be separate and discrete components of a system as illustrated in FIG. 1. Any two or more of the modules and sub-modules of the system 10 described herein can be part of an integral system and can be arranged in any manner desired capable of performing the functions described in greater detail below.

The user insurance values and interface module 12 illustrated in FIG. 1 has two sub-modules: a current values sub-module 16 and a proposed values sub-module 18. The current values module 16 functions to retrieve data used to determine the premiums of an insurance company (e.g., the user). This information can be stored in a memory 22 in communication with the current values module 16. The memory 22 can take any conventional form, including without limitation volatile and non-volatile memory, random access memory (RAM), read-only memory (ROM), computer chips, disks, and other memory devices, and any other type of memory in which data can be temporarily or permanently stored. In this regard, the memory 22 can be located anywhere with respect to the other portions of the present invention while still enabling information to be stored and retrieved therein.

As is well known in the art, insurance companies employ a number of different variables to calculate the amount (premium) that is charged for an insurance policy. This amount is calculated in different manners by different insurance companies, and depends at least in part upon the type of policy involved. By way of example only, the system 10 illustrated in the figures and described herein is adapted to compare insurance rates of automobile insurers. However, it will be appreciated by those in the art that the present invention can be employed to compare insurance rates for any other type of insurance, such as home insurance, life insurance, disability insurance, and the like, the premiums of which are each calculated using a series of variables in a manner similar to auto insurance premiums. In addition, the present invention can be employed to calculate and compare proposed insurance premiums and to test the impact that changes (to the manner in which such premiums are calculated) will have on insurance premiums. In this manner, insurance companies and other users can determine the positions of insurance companies in the market following one or more changes to insurance policy calculations.

As mentioned above, the variables employed to calculate an insurance premium can vary from insurance company to insurance company. Some variables commonly employed in the automobile insurance industry include the amount of insurance protection desired for medical payments associated with a claim on an insurance policy, the amount of property damage protection desired, the desired deductible of the insurance policy, the age, sex, marital status, and location of the insured party, the type and age of the vehicle insured, the amount of protection desired against underinsured or uninsured motorists, the driving record of the insured party, and the like. Typically, each of these "rating factors" are given a numerical value that can be used in a formula or formulas to calculate the amount of risk anticipated in insuring a party. This amount of risk (also typically a numerical value) is therefore employed as a multiplier or other variable to determine the premium of an insurance policy for the insured party. By way of example only, insurance companies can have an established base insurance premium that is increased or decreased by being multiplied by a series of numbers, each number representing a rating factor as described above to reflect the particular individual being insured.

Referring back to FIG. 1, rating factors and base insurance premiums of the user can be stored in the memory 22 and can be retrieved by the current values module 16. An example of information retrieved by the current values module 16 is illustrated in FIG. 2, which is a user interface screen 24 showing a number of rating factors used to determine the base rates of an insurance company to which other insurance companies will be compared. For example, if the system 10 according to the present invention is employed by a user (e.g., an insurance company) to compare the user's premiums to premiums of other insurance companies, this user interface screen 24 can display the current values of the rating factors used to determine the user's premiums. Any number of such current rating factor values can be displayed on the current values user interface screen 24, such as rating factor values for the amount of medical payment protection desired by an insured, rating factor values for the age, sex, and marital status of an insured, and values for any other rating factors (including those mentioned above). The exemplary data illustrated on the current values interface screen in FIG. 2 are the current rating factor values for different types of insurance (e.g., combined single limit ("CSL"), bodily injury ("BI"), and the like) listed as a function of location within a state (i.e., "territory").

It will be appreciated by those in the art that a large amount of data can be included in the current values user interface screen 24. Accordingly, the current values user interface screen 24, like the other user interface screens of the present invention described herein, can be on a single or multiple screens and can be formatted in any manner desired. For example, a number of rating factors are presented on other tabs 25 (see FIG. 2) of the user interface screen. Current rating factor values used by insurance companies to calculate the premiums offered by insurance companies are well known to those in the art and are not therefore described further herein.

The current values user interface screen 24 in the illustrated embodiment does not permit a user to modify the information displayed on the current values user interface screen 24. In order for a user to change one or more of these values to determine the impact the change would have on premiums or upon the user's position in the marketplace, the user enters one or more changes in the system via the proposed values module 18 (see FIG. 1). The proposed values module 18 can receive data from the memory 22 or from the current values module 16. In the illustrated embodiment, the proposed values module 18 receives the current rating factor values referred to above, and displays the current rating factor values on a user interface screen 26 (see FIG. 3). Unlike the current values user interface screen 24 described above, the user interface screen 26 of the proposed values module 18 enables a user to change one or more of the rating factors displayed thereon. Therefore, this proposed values user interface screen 26 can be a copy of the current values user interface screen 24, but can instead be modified as desired by a user. In the illustrated embodiment, a number of rating factor values have been changed by a user, and are highlighted in various cells 27 on the proposed values user interface screen 26. Like the current values user interface screen 24 described above, additional rating factors and their corresponding values (both changed and unchanged) can be presented in other tabs 29 of the proposed values user interface screen 26.

Although the embodiment of the present invention illustrated in the figures employs two sub-modules 16, 18 each providing one or more user interface screens to present data to a user, one having ordinary skill in the art will appreciate that different arrangements of sub-modules and screens are possible and fall within the spirit and scope of the present invention. For example, a single user interface screen can be associated with the current and proposed values sub-modules 16, 18, and can be generated to display the current rating factor values of the user in fields that can be changed as desired. Changed fields in such an embodiment can be reset to the current values in any suitable manner. The user insurance values and interface module 12 can be arranged in any manner capable of retrieving current rating factor values and/or other current premium information for display to a user and for modification by a user.

With reference again to FIG. 1, a processor 30 can be used to retrieve and store data in the memory 22, and to control communication with the user insurance values and interface module 12 and sub-modules thereof. The processor 30 can be a processor of a computer or can take any other form desired, including without limitation one or more application-specific integrated circuits (ASICs), discrete logic elements, software-based processors (including such software programs as Excel by Microsoft, Lotus 1-2-3 by IBM, Quattro-Pro by Corel, and the like), internet-based processors, hardware-based processors, and any other electronic data processing device or system. In order to enable a user to enter information into the system 10, a keyboard 32 can be coupled to the processor 30. Any other user-manipulatable control for data entry can be employed instead or in addition, such as a touch screen, trackball, joystick, mouse, and the like.

As mentioned above, it is often desirable for a user to be able to easily compare one or more insurance premiums with one or more insurance premiums of another party. In addition, it is often desirable for a user to be able to easily determine how a change to an insurance premium will affect the user's market position with regard to an insurance product. By way of example only, a user may wish to increase or decrease the value of a particular rating factor used to determine the premiums of insurance products sold by the user. Before making such a change, it can be advantageous for the user to determine how the changed premiums compare to the premiums of similar products offered by other insurance companies. However, the effect such a change will have often depends greatly upon the number and types of insurance products sold by the user. A change to one rating factor can have a much larger effect upon one user's business than upon the business of another. For example, an increase in the weight given to the type of vehicle (e.g., sports cars or luxury cars) covered by a policy can have a greater effect to a user's insurance business in higher-income areas than in lower-income areas. As another example, an increase in the weight given to the age of the policyholder (e.g., drivers over the age of 60) can have a greater effect to a user's insurance business in a neighborhood of older residents than in a neighborhood of younger residents.

In order to determine the effect a change will have to a user's existing and future insurance product portfolio, a user can enter new (proposed) values into the proposed values user interface screen 26. These values are then employed by the rate comparison module 100 (see FIG. 1) to determine the effect of the proposed values as will be described in greater detail below.

Although any user can benefit from the insurance premium comparison information described herein, the following discussion is with reference to an insurance company desiring to compare the premiums of one or more insurance products of the insurance company with the premiums of one or more insurance products offered by another insurance company.

Figure 3:
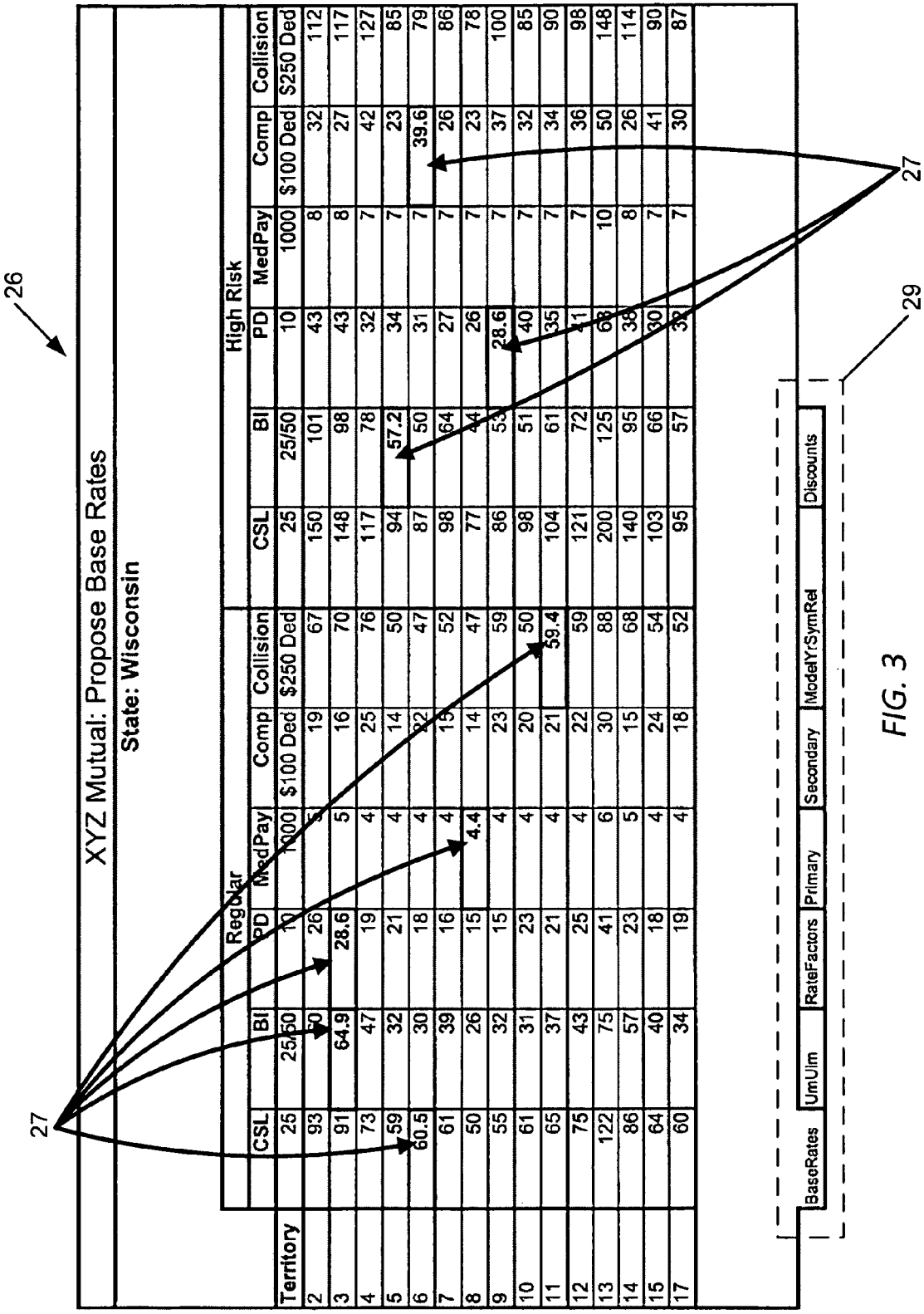
FIG. 3 is a proposed values user interface screen for the insurance rate comparison system of FIG. 1.

After a user has entered (via the proposed values user interface screen 26) one or more proposed changes to any number of rating factors or any other variables used to calculate insurance premiums as shown in FIG. 3, the rate comparison module 100 can be employed to determine the impact of the changes to the user's existing and future insurance policies. In particular, the rate comparison module 100 can display a rate comparison user interface screen 34 (see FIG. 4A) in which a user can enter information regarding a type or types of insurance policies to be compared. Specifically, one or more fields 36 on the rate comparison user interface screen 34 permit a user to specify the type or types of insurance policies of the user which will be compared to similar policies of other insurance providers. In the exemplary rate comparison user interface screen 34 illustrated in FIG. 4A, a user has entered data regarding an insurance policy having a bodily injury coverage limit of $250,000/$500,000, a property damage limit of $100,000, a medical payment limit of $5,000, and uninsured motorists limit of $250,000/$500,000, and an underinsured motorists limit of $250,000/$500,000.

Using the type of insurance policy entered by the user, the rate comparison module 100 calculates the premiums of one or more parties. In particular, the rate comparison module 100 uses a formula to calculate one or more premiums of insurance policies offered by the user as well as to calculate one or more premiums of insurance policies offered by other insurance companies, and then displays the premiums for comparison by the user.

Figure 4A:
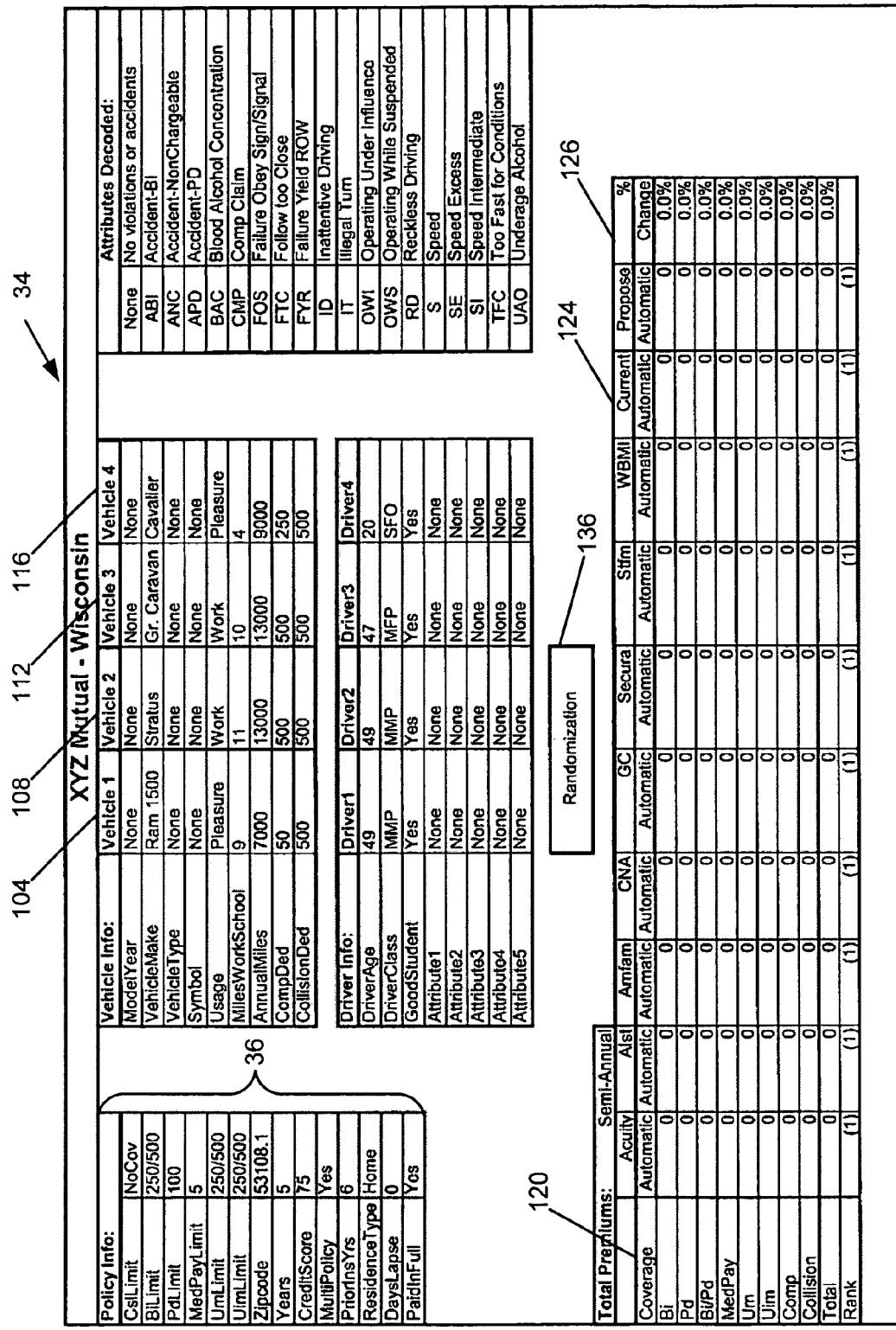
FIG. 4A is a rate comparison user interface screen of the rate comparison module illustrated in FIG. 1, shown prior to a rate comparison.

The rate comparison module 100 can take any form desired, and in the illustrated embodiment of FIG. 4A has two tabs: a rate tab 128 and a random tab 132. The rate tab 128 is employed to rate and compare premiums of policies based upon information input by the user. The random tab 132 (described in greater detail below) is employed to instead display premiums calculated by the rate comparison module 100 using data from hypothetical vehicle and driver samples constructed by the rate comparison module 100.

The rate comparison module 100 shown in FIG. 1 can be a real-time comparative rating module of the system 10. In this embodiment, the rate comparison module 100 does not require queuing of parameters to a rating engine. In other words, as a user changes data on the application (i.e., the rate comparison user interface screen 34), the premiums are changed simultaneously. In other embodiments however, the rate comparison module 100 does not operate in real-time to update parameters as just described.

The rate comparison module 100 in the illustrated embodiment can perform a comparison between a user's premium(s) and the premium(s) offered by other insurance companies by determining the premiums for one or more vehicles—each having different vehicle and driver attributes. Although the premiums can be calculated for any number of vehicles for this purpose, the rate comparison user interface screen 34 in the illustrated embodiment has fields for up to four different vehicles (i.e., in blocks 104, 108, 112, and 116; columns F to H, rows 4-12) with four corresponding drivers (i.e., in blocks 104, 108, 112, and 116; columns F to H, rows 15-22). The information regarding each vehicle can be hypothetical or can be actual data from vehicles already insured or proposed to be insured by the user, and can be manually entered. In some embodiments, one or more of the vehicle or driver attributes can be entered using a menu of possible options (e.g., a pull-down or pop-up menu enabling a user to select from one of several entries for the selected attribute field).

The premiums of the user and of the other insurance companies are calculated by the rate comparison module 100 based upon the information entered in the vehicle and driver information fields for each vehicle 104, 108, 112, 116. The premiums are calculated using one or more formulas as mentioned above. To calculate the user's premium for each vehicle prior to the proposed changes described above, the processor 30 draws the data from the vehicle and driver fields 104, 108, 112, 116 for each vehicle, draws policy data from the policy type fields 36, identifies and draws the proper current values data (corresponding to the policy type fields 36 in the rate comparison user interface screen 34) from the memory 22 and/or from the current values module 16, and uses this data in a formula or formulas to calculate the user's current premium. To calculate the user's proposed premium for each vehicle, the processor 30 draws the data from the vehicle and driver fields for each vehicle 104, 108, 112, 116, draws policy data from the policy type fields 36, identifies and draws the proper proposed values data (corresponding to the policy type fields 36 in the rate comparison user interface screen 34) from the memory 22 and/or from the proposed values module 18, and uses this data in a formula or formulas to calculate the user's proposed premium.

To calculate a competitor's premium for each vehicle, the processor 30 draws the data from the vehicle and driver fields for each vehicle 104, 108, 112, 116, draws policy data from the policy type fields 36, identifies and draws the ratings data for the competitor (i.e., the competitors rating data corresponding to the policy type fields 36 in the rate comparison user interface screen 34) from the memory 22, and uses this data in a formula or formulas to calculate the competitor's premium. This process can be repeated for as many competitors as desired, such as for all competitors or only competitors selected for comparison by the user. In this regard, the ratings data for each competitor can be stored in the memory 22 in individual files referenced by the processor 30 or in any other manner desired.

The process of employing a processor 30 to calculate a premium of a user's insurance policy or of a premium of a competitor's insurance policy based upon information regarding a particular vehicle and driver is conventional in nature and is not therefore described further herein.

Figure 4B:
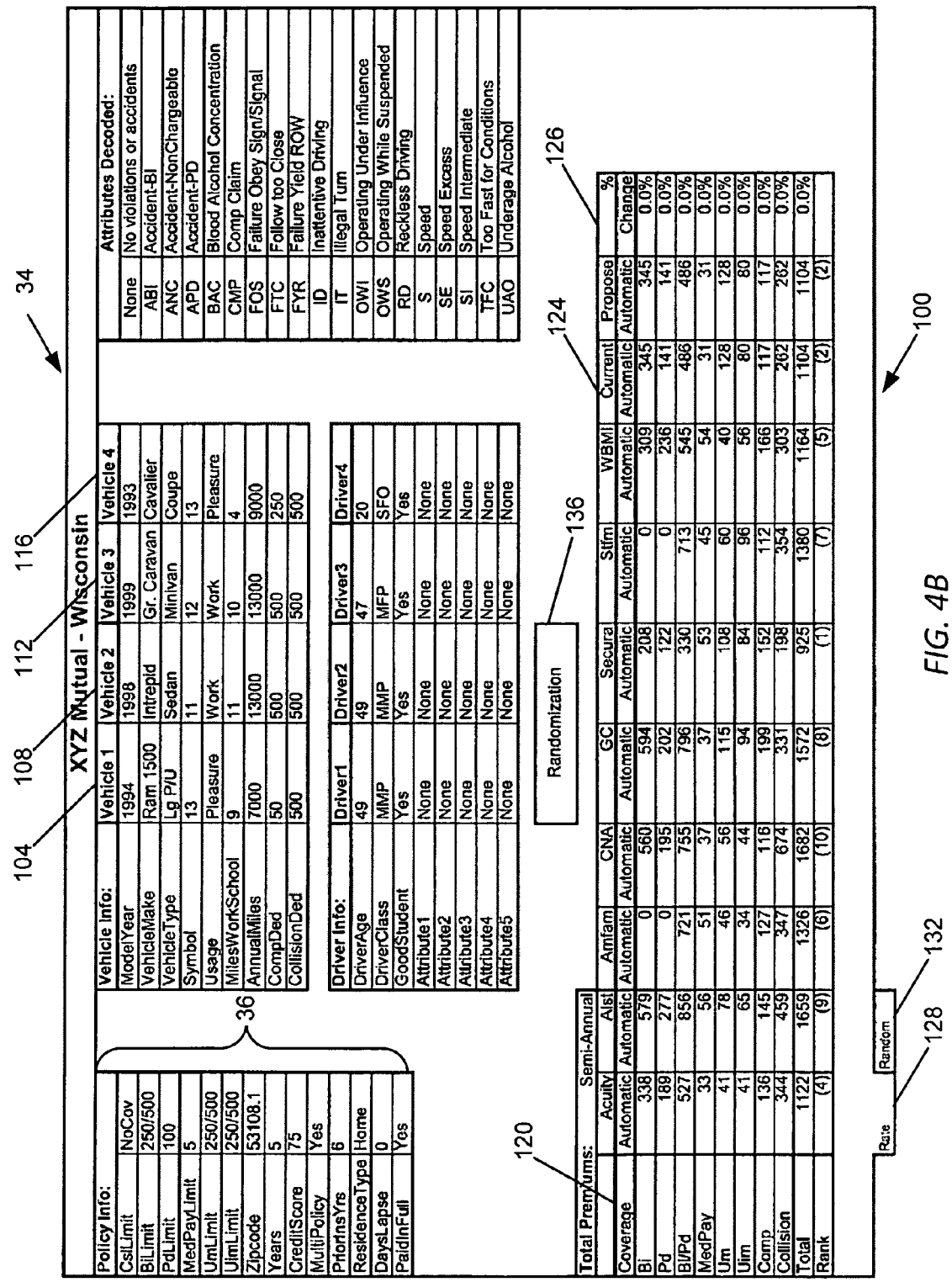
FIG. 4B is the rate comparison user interface screen illustrated in FIG. 4A, shown with data for four vehicles and drivers entered by a user and with the total premiums for all four vehicles for a number of different insurance carriers.

After the current and proposed user's premiums and the competitor's premiums are calculated as described above, the premiums for each vehicle can be displayed for comparison by a user. Alternatively or in addition, a total can be taken of all vehicles for each premium, thereby generating a summed premium that can be more easily compared. In the illustrated embodiment, when the total premium for all vehicles have been calculated, they are displayed in a premium block 120 (columns A-I, rows 26-36) as shown in FIG. 4B in the rate comparison user interface screen 34 (insurance providers shown along the top of the premium block 120 and types of insurance coverage shown along the left side of the premium block 120). The premium block 120 includes the user's premiums calculated using the user's current rating factor values (see the current rate block 124 in column J, rows 26-36). The premium block 120 also includes the user's premiums calculated using the user's proposed rating factor values (see the proposed rate block 126 in column K, rows 26-36).

In some embodiments, a total is taken of the premiums calculated by the rate comparison module 100 for each vehicle and driver sample. These premium totals can then be displayed for comparison by a user. An example of such a comparison is presented at the bottom of FIG. 4B. Each premium illustrated in the premium block 120 is a sum of the four premiums calculated for the four vehicle and driver samples at the top of FIG. 4B. Alternatively or in addition, the premium data for each vehicle and driver sample can be separately presented in any form for review by the user, such as the individual vehicle and driver premium data illustrated in FIG. 4C (in another location on the rate comparison user interface screen 34 illustrated in FIG. 4B).

It may be desirable to view factors instead of premiums calculated by the rate comparison module 100 used to calculate the premiums just described. Some embodiments of the present invention therefore present this data or otherwise make this data available to the user. For example, the rating factor values calculated for the vehicles on FIG. 4B are presented in FIG. 4D (yet another location on the rate comparison user interface screen 34 illustrated in FIG. 4B). The factors can be presented in their raw form, can be normalized, or can be presented in any other manner desired.

Figure 4E:
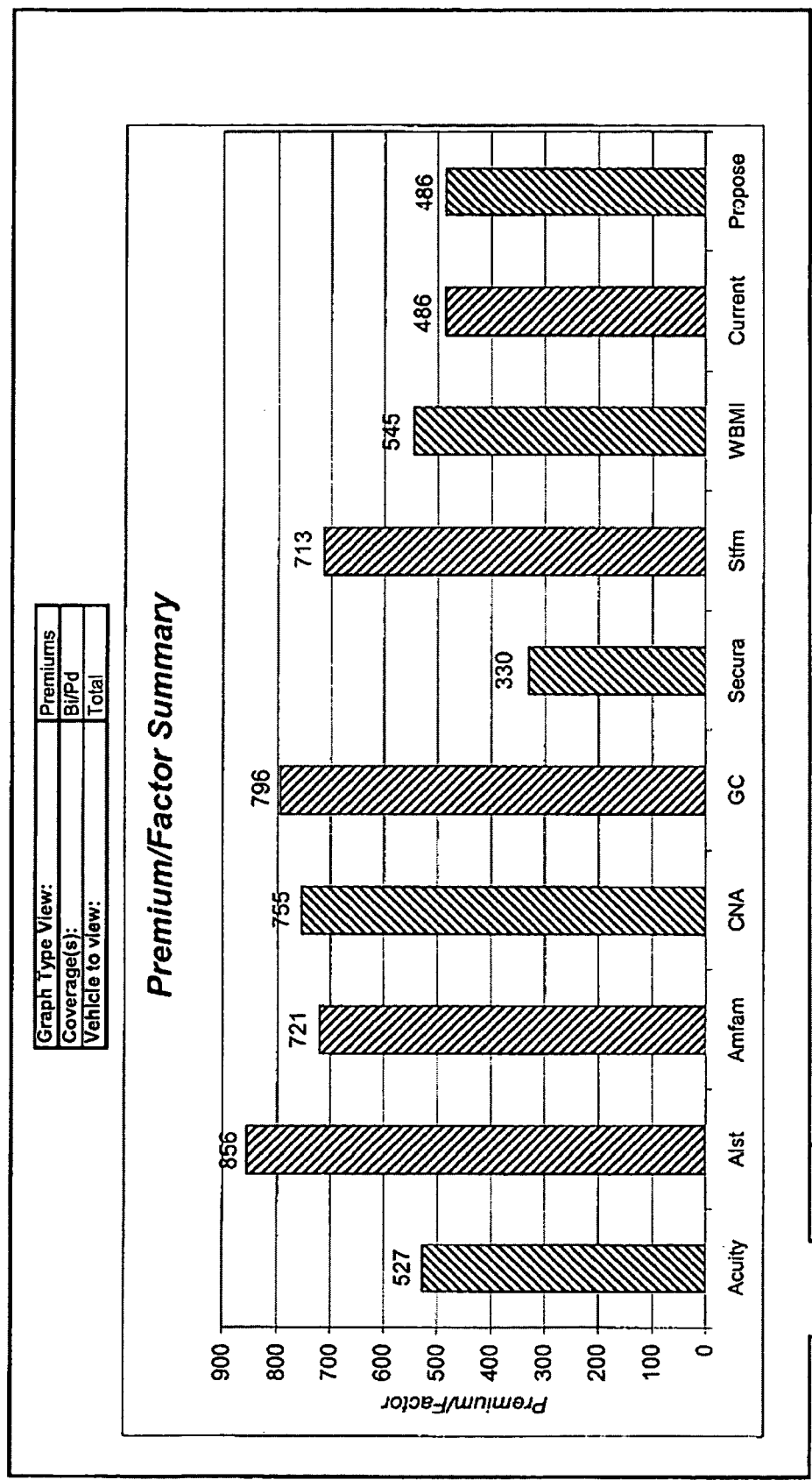
FIG. 4E is another portion of the rate comparison user interface screen illustrated in FIG. 4A, showing a bar chart comparing one premium type presented in FIG. 4B.

In some embodiments, the premium data calculated by the rate comparison module 100 can be presented in graphical format for assessment by a user. In particular, this information can be displayed in any manner desired, and is shown in a table format in FIG. 4B by way of example only. Alternatively or in addition, the rate comparison module 100 can display part or all of this information graphically, such as in a bar chart as shown in FIG. 4E (displaying the Bodily Injury Limit/Property Damage type of insurance coverage from row 29 of FIG. 4B). Graphical forms of the premium data can be presented on the rate comparison user interface screen 34 as shown in FIG. 4E (yet another location on the rate comparison user interface screen 34 illustrated in FIG. 4B) or in any other location desired. Once the user's position relative to competitors and current premiums is determined, the user is able to analyze different rating factors by comparing the relative premium positions, and can determine an appropriate course of action. If desired, the user can return to the proposed values user interface screen 26 to make further changes in order to compare the resulting proposed premiums on the rate comparison user interface screen 34 with the other premiums as just described. This process can be repeated as often as desired in order to help the user compare different courses of action and market positions.

In short, if a user changes information entered in the rate tab 128, the rate-compare module 100 responds by accessing rating factors (e.g., from a plurality of cells in the user insurance values and interface module 12 or data stored in the memory 22) based upon the user-input information, and rates out a risk scenario. In some embodiments, the premiums are calculated and updated in real time.

The exemplary system 10 illustrated in the figures enables a user to compare insurance policy premiums in another manner. As an alternative to the use of vehicle and driver information entered as described above, the system 10 enables a user to select a randomization function in which the system 10 generates hypothetical vehicles and drivers for which current, proposed, and competitor insurance premiums can be calculated and compared. In some embodiments of the present invention, the system 10 has no fields or data blocks 104, 108, 112, 116 for user entry of vehicle and driver information as described above. However, in some embodiments such as that shown in the figures, this randomization function is used as an alternative to the vehicle and driver data blocks 104, 108, 112, 116

By generating hypothetical vehicle and driver samples, a user can simulate a number of policies and their corresponding premiums. Therefore, the user can determine the corresponding premiums using the current rating factor values (i.e., how much each policy would cost for each vehicle and driver based upon the current rating factors used by the user), the proposed rating factor values (i.e., how much each policy would cost if one or more of these values are changed), and the competitor rating factor values (i.e., how much each insurance company competitor would charge for the same policy using the rating factor values). Upon determining the premiums for each hypothetical vehicle and driver sample generated by the rate comparison module 100, the premiums can be summed, displayed, and compared as described above. The use of randomly generated vehicle and driver samples can therefore save significant time compared to the process of obtaining and manually entering real or hypothetical vehicle and driver samples.

In some embodiments of the present invention, the same series of calls for data used in calculating premiums for vehicle and driver samples in blocks 104, 108, 112, and 116 is used in randomly generated vehicle and driver samples (i.e., in a batch rating process of the rate compare module 100). The batch rating process or "randomization" process uses a set of methods to generate different risk scenarios. Rather than require the user to develop sample policies, the randomization process can be employed to automatically generate a wide variety of sample risks with only a few keystrokes.

In order to prepare a set of hypothetical vehicle and driver samples for which policies can be generated and the corresponding premiums can be compared, each rating factor used to calculate insurance policy premiums (as described above) is assigned one or more potential values, and in some cases a range of values. Each hypothetical vehicle and driver sample is defined by a number of parameters (e.g., the rating factors described above) some of which can include driver age, driver sex, driver marital status, desired protection against uninsured or underinsured motorists, desired amount of property damage protection, and the like. Each such parameter has one or more values.

For example, the driver's age can have a value for each possible driver's age from 16-100. As another example, the driver's sex can have two possible values (male and female). As another example, the driver's marital status can also have two possible values (married or not married). As another example, the desired protection against uninsured or underinsured motorists can have a number of possible values (e.g., no coverage, $25,000/$50,000, $50,000/$100,000, $100,000/$300,000, $150,000/$300,000, $250,000/$500,000, $300,000/$300,000, and $500,000/$500,000). As yet another example, the desired property damage limit can have a number of possible values (e.g., no coverage, $10,000, $15,000, $25,000, $50,000, $100,000, and $250,000). Still other rating factors can have any number of possible values. Some of the rating factor values are dependent at least in part upon the possible types of parties that may be existing or future policyholders of the user, while other rating factor values are dependent at least in part upon the type of insurance offered by the user or other insurance companies.

For each hypothetical vehicle and driver sample prepared by the rate comparison module 100, each rating factor is randomly assigned a value from one of the possible values for that rating factor. In some cases, the rating factor has only one possible value, while in other cases the rate comparison module 100 has two or more values from which the rate comparison module 100 chooses. After the desired number of hypothetical vehicle and driver samples have been prepared in this manner, the rate comparison module 100 can calculate the cost of a premium as described above for each hypothetical vehicle and driver sample using the values of the sample.

In some embodiments, the rate comparison module 100 randomly selects between the possible values for vehicle and driver sample parameter in an equal manner. In other words, each possible value for each parameter has an equal chance of being selected. In other embodiments however, one or more of the parameters have possible values that are unequally weighted with respect to the others. This can better reflect real-world scenarios in which a party is more likely to choose certain types of insurance coverage than others or in which a party is more likely to have certain characteristics than others. By way of example only, based upon a user's knowledge of his or her market, the user may be aware that a party is more likely to select an uninsured motorists protection amount of $100,000/$300,000 than a significantly greater amount (e.g., $500,000/$500,000). Therefore the various potential values in one or more of the rating factors described above can be weighted to reflect the probability of parties to fall into one or more of such values.

It should be noted that for each hypothetical vehicle and driver sample generated by the rate comparison module 100, none, some, or all of the parameters can have unequally weighted possible values. When generating each hypothetical vehicle and driver sample, the rate comparison module 100 can randomly select from the possible values of each parameter (in an equally or unequally weighted manner as described above) in a number of different manners. In the illustrated embodiment, a random number is generated for each parameter. The random number generated corresponds to one of the possible values of the parameter. In this regard, each possible value of a parameter can be assigned a range of numerical values, each range corresponding to a random number generated by the rate comparison module 100. For example, in some cases the insurance premium of a student can be reduced if the student has performed well in school. In such cases, a "good student discount" parameter can exist for a hypothetical vehicle and driver sample, wherein a "yes" value can be assigned a range of numbers from 0-4, and a "no" value can be assigned a range of numbers from 5-9. If the random number selected is 7, the good student parameter for the hypothetical vehicle and driver sample would be assigned as "no". If the random number selected is 1, the good student parameter would be assigned as "yes".

As another example, a vehicle use parameter can be employed in calculating premiums, wherein the vehicle use parameter includes "pleasure", "school", "work", "business", and "farm" values. In such a case, the "pleasure" value can be assigned a range of numbers from 0-1, the "school" value can be assigned a range of numbers from 2-3, the "work" value can be assigned a range of numbers from 4-5, the "business-"value can be assigned a range of numbers from 6-7, and the "farm" value can be assigned a range of numbers from 8-9. If the random number for this parameter selected is 5, the vehicle use parameter would be assigned as "work". As another example, if the random number for this parameter selected is 0, the vehicle use parameter would be assigned as "pleasure".

In both examples just presented, each possible value is given an equal weight (e.g., 50% for male and 50% for female; 20% for each vehicle type). However, as described earlier, the possible values for one or more parameters of a hypothetical vehicle and driver sample need not necessarily be equally weighted. If one or more possible values for any parameter are more likely than others, the possible values can be weighted differently to reflect this likelihood. For example, if a user is three times as likely to have a vehicle usage of "work" rather than "business", the above-described distribution can be reassigned in order to reflect real-life vehicle and driver samples as follows: the "work" value can be assigned a range of numbers from 4-6 while "business" is assigned the number 7. Any other probability distribution can be employed for any one or more of the variables as desired.

As indicated above, the randomization process creates policies by randomly selecting from a plurality of available values of one or more rating factors. For example, if available bodily injury limits are $25,000/$50,000, $50,000/$100,000, $100,000/$300,000 and $250,000/$500,000, the randomization process selects a limit based upon a probability assigned to each limit (or otherwise randomly selects a limit based upon equal probabilities for each limit). In some embodiments, the probabilities can be assigned to mirror real world probabilities. For example, the probabilities can be assigned so the probability of a $100,000/$300,000 limit being selected is much greater than a $25,000/$50,000 limit. The process continues with any additional rating factor variables being selected, such as rating factor variables for coverage limits, deductibles, vehicles, drivers and attributes such as accidents and violations.

With continued reference to the illustrated embodiment of the present invention, the randomization process can be initiated by a user selecting any user-manipulatable control such as the "randomization" button 136 on the rate comparison user interface screen 34 or by entering a command via the keyboard 32 (see FIG. 1).

Figure 5:
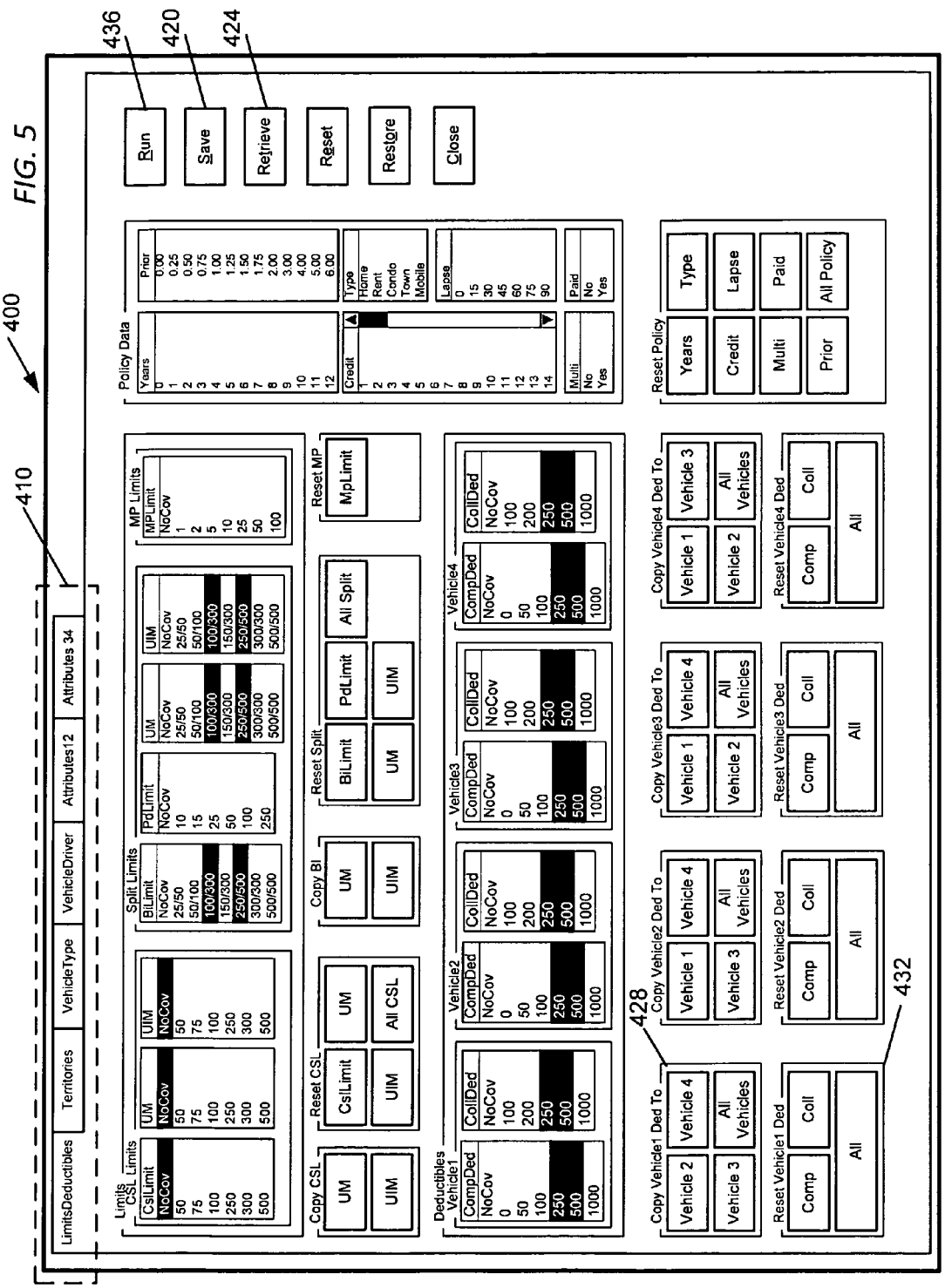
FIG. 5 is a randomization interface screen of the rate comparison module illustrated in FIG. 1, shown with parameters selected.

In some embodiments of the present invention, a new user interface screen is generated by the processor 30 and the rate comparison module 100 upon selection of the randomization function. An example of such a user interface screen is presented in FIG. 5. In this exemplary randomization interface screen 400, the user has the ability to select a number of the variables (e.g., rating factors) used to calculate premiums as described above. For example, if a user wishes only to generate policies in which split bodily injury limits are $100,000/ $300,000 or $250,000/$500,000, the user can select these limits on the randomization interface screen 400 as shown in FIG. 5. Similarly, if a user wishes only to generate policies in which comprehensive and collision deductibles are $250 or $500, the user can select these limits on the randomization interface screen 400 as also shown in FIG. 5. As another example, if a user wishes only to generate policies in which only split bodily injury limits are provided, a no coverage ("NoCov") choice can be selected in alternative policy types (e.g., in the combined single limit ("CSL") and uninsured/ underinsured motorists ("UM/UIM") variables). In some embodiments, if no possible values are selected for a variable, the randomization process selects from all available options for that variable.

Only some of the variables used to calculate premiums are illustrated in FIG. 5. Other variables are included in other screens 410, such as territories, types of vehicles, driver attributes, and the like. Like the insurance coverage type variables illustrated in FIG. 5, these other screens 410 can each display other variables, each having one or more different possible values that can be selected by a user to tailor the randomization process as desired. Although a large number of variables are shown in FIG. 5 each having a number of possible values that can be selected, other embodiments of the present invention can have any other number of variables having any other number of possible values that can be selected by a user. As shown in FIG. 5, the rate comparison module 100 can enable more than one possible value to be selected for each variable, although in some cases only a single possible value, a minimum or maximum number of possible values, or an exact number of possible values can be required. (As with any Windows application for example, to select more than one option, hold down the control key [Ctrl] to select non-adjacent items or the shift key [Shift] to select a continuous list.)

As mentioned above, the possible values that can be selected for one or more variables (e.g., rating factors) need not necessarily be equally weighted. In some embodiments of the present invention, the user can select the manner in which the various possible values of any one or more variables are randomly selected by the rate comparison module 100. For example, the user can select to change a particular variable by manipulating any user-manipulatable control on the randomization interface screen 400 (e.g., a button, file, pull-down menu, etc.), by double-clicking or "right-clicking" the variable on the randomization interface screen 400 with a mouse or other controller, by a command via the keyboard 32, and the like. A menu, screen, window, or other user interface can then be activated to enable the user to assign different weights to one or more of the possible values in that variable. By way of example only, and with reference to FIG. 5, a user can double-click the bodily injury limits ("BiLimit") on the randomization interface screen 400 to generate another screen in which one or more of the possible values can be assigned numerical or symbolic weights (e.g., 5% for NoCov, 10% for 25/50, 25% for 50/100, 30% for 100/300, 0% for 150/300, 20% for 250/300, 5% for 300/300, and 5% for 500/500). Such an assigned distribution can be selected to reflect the profile of a user's current or anticipated insurance business. In some embodiments, any one or more of the variables used to calculating premiums can be manipulated in a similar manner as desired by a user.

After a user has selected the possible values he or she wishes (and in some cases, the probability distributions for such values) for the variables in the randomization interface screen(s) 400, the selections and/or distributions can be saved in some embodiments for use at a later time by clicking on a "Save" button 420 or by manipulating another control for this purpose. Such selections can thereby be saved in the memory 22 or in another memory in any conventional manner. Likewise, to retrieve an already saved set of selections, the user can click on a "Retrieve" button 424 or can manipulate another control for this purpose. The user can also be given the option to copy selections into one or more variables and/or to reset the variables, such as by clicking a "copy" button or a "reset" button, respectively, from a plurality of copy button groups 428 and a plurality of reset button groups 432, respectively, as shown in FIG. 5.

Figure 6:
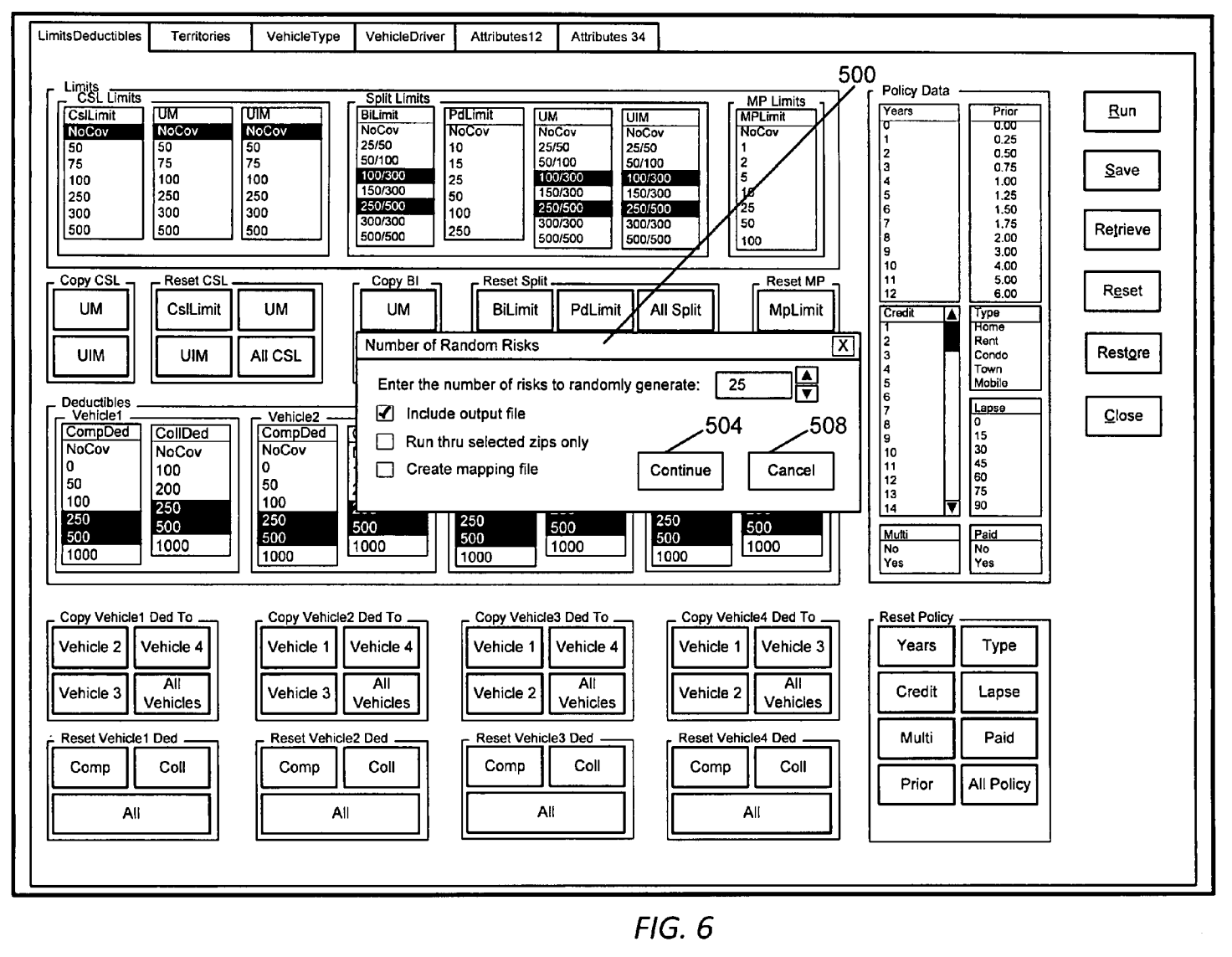

After the rating factors and other variables have been assigned on the randomization interface screen(s) 400, the user can begin the process of generating hypothetical vehicle and driver samples by operating any type of user-manipulatable control such as a "Run" button 436 on the randomization interface screen 400, by a command entered via the keyboard 32, and the like. In some embodiments, the rate comparison module 100 permits a user to enter the number of hypothetical vehicle and driver samples to be generated, such as by entering a number on the randomization interface screen, by prompting the user by a pop-up window 500 as shown in FIG. 6, or in any other suitable manner.

In some embodiments, the data regarding each hypothetical vehicle and driver sample generated by the rate comparison module 100 is not readily accessible to the user, and is stored or is otherwise available only for the rate comparison module 100 and the processor 30 in generating premium data for the samples. In other embodiments however, this data is available for viewing by the user and/or is input to a file to be stored in a memory (e.g., memory 22). For example, the pop-up window 500 in the exemplary embodiment in the figures enables a user to select whether the hypothetical vehicle and driver sample data will be output to a file. This output file can include a listing of the rating parameters and premiums generated for each company for each vehicle on a policy. In the illustrated embodiment of FIG. 6, once the selections are made on the pop-up window 500, the user can select either the "Continue" button 504 to generate the hypothetical vehicle and driver samples or the "Cancel" button 508 to go back to the randomization interface screen 400.

As described above, the rate comparison module 100 draws the policy information data selected by the user (see, for example, cells 36 in FIG. 4A) and the values for the various rating factors in the randomization user interface screen 400 to generate one or more hypothetical vehicle and driver samples. The samples can represent a profile of the existing or expected future customers of the user or can represent any other profile of individuals for which testing is desired. The data (e.g., rating factor values) from each sample generated is used to calculate the premiums for each sample. More specifically, using the formula or formulas for calculating insurance premiums of the user and of other insurance companies and using the data from each hypothetical vehicle and driver sample, the rate comparison module 100 calculates the premiums that would be charged by the user for an insurance policy for each sample and/or the premiums that would be changed for any number of other insurance companies for each sample.

These calculated premiums can be presented in any manner desired, such as in a list, table, and the like. In the illustrated embodiment, the calculated premiums are presented on the random tab 132 of the rate comparison user interface screen 34 (see FIG. 7A). These calculated premiums can be presented individually or in groups. In some embodiments, the data for each vehicle and driver sample can be presented separately along with the calculated premiums for insurance policies of the user and/or any other insurance companies desired. In other embodiments, the sample and premium data can be manipulated by the rate comparison module 100 prior to being presented to the user. Also, in some embodiments such as that shown in FIG. 7A, only the premium data for the vehicle and driver samples is presented—either individually or after being manipulated. For example, the rate comparison module 100 can add the sample and premium data of two or more vehicle and driver samples and can present the calculated and summed premiums. Repeating this process for other groups of vehicle and driver samples, the resulting summed premiums can be presented in any manner desired. As another example, the rate comparison module 100 can calculate an average premium for every two or more samples and can present the averaged premiums in any manner. In short, the premiums calculated for the hypothetical vehicle and driver samples can be presented in any manner desired.

Figure 7C:
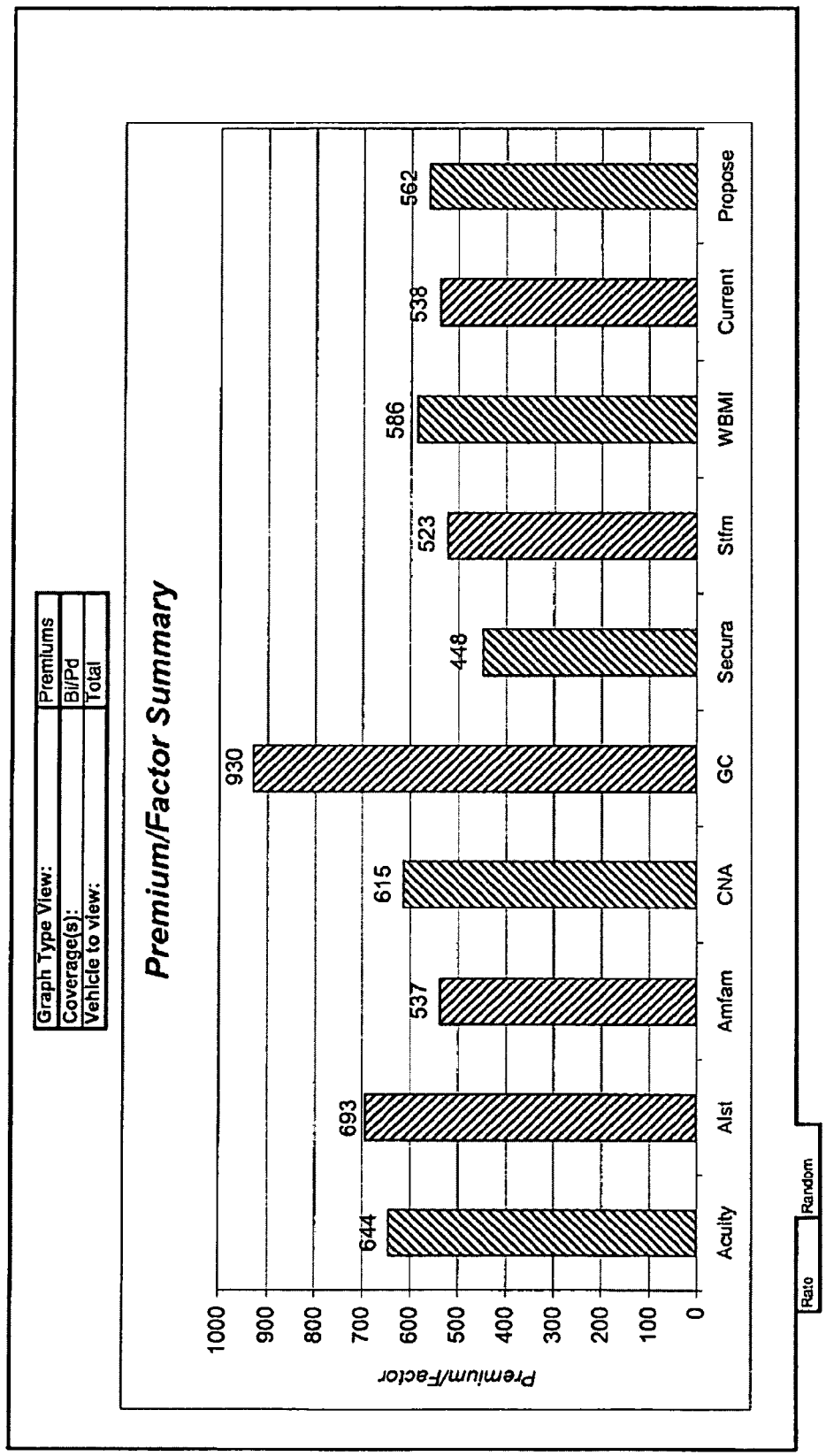
FIG. 7C is another portion of the randomization interface screen illustrated in FIG. 7A, showing a bar chart comparing one premium type presented in FIG. 7A.

With continued reference to the embodiment illustrated in FIG. 7A, the average premiums calculated for a number (e.g., four) of the hypothetical vehicle and driver samples are added and presented in a block of cells 605 of the random tab 132 in the rate comparison user interface screen 34, while an average of the premiums for groups of individual vehicle and driver samples is presented in other blocks of cells 610 (one of which is visible in FIG. 7A). If desired, this data can be normalized by dividing by a common number (e.g., by the user's current premium as shown in the block of cells 615 in the portion of the random tab 132 shown in FIG. 7B, by another party's premium, or by any other number). The data in the random tab 132 can be presented in any manner, such as in tabular form as just described, in charts or graphs, and the like. For example, the premium data for any one or more of the coverage types on the random tab 132 can be presented in a bar chart such as that shown in the portion of the random tab 132 shown in FIG. 7C.

For an overview of the data generated by the rate comparison module 100, the rate comparison module 100 can calculate an average or sum of each premium offered by each insurance company (i.e., the user and/or any number of other insurance companies) and can present the averages or sums in any form, such as in a table, graph, or other manner. For example, using the same vehicle and driver samples, the premium for bodily injury protection for each sample can be calculated for each insurance carrier, and can be presented in a table, bar chart, graph, or other form. By presenting the data in this manner, the user can readily and easily compare the insurance premiums of each insurance provider, and can compare the user's position with other insurance providers in the market. It will be appreciated that such a comparison can be made by manipulating the calculated premiums of the hypothetical vehicle and driver samples in a number of other manners (besides summing or averaging multiple calculated premiums).

For example, for each insurance company being compared, the median premium of a number of premiums (one for each vehicle and driver sample) can be calculated and presented. As another example, the mean premium can instead be calculated and presented. Alternatively or in addition, each calculated premium of the sample can be multiplied or divided by a common number (e.g., normalized). Still other manners exist for presenting a number that is representative of a group of premiums of an insurance company for comparison with other such numbers (corresponding to other insurance companies), each of which falls within the spirit and scope of the present invention.

Figure 8:
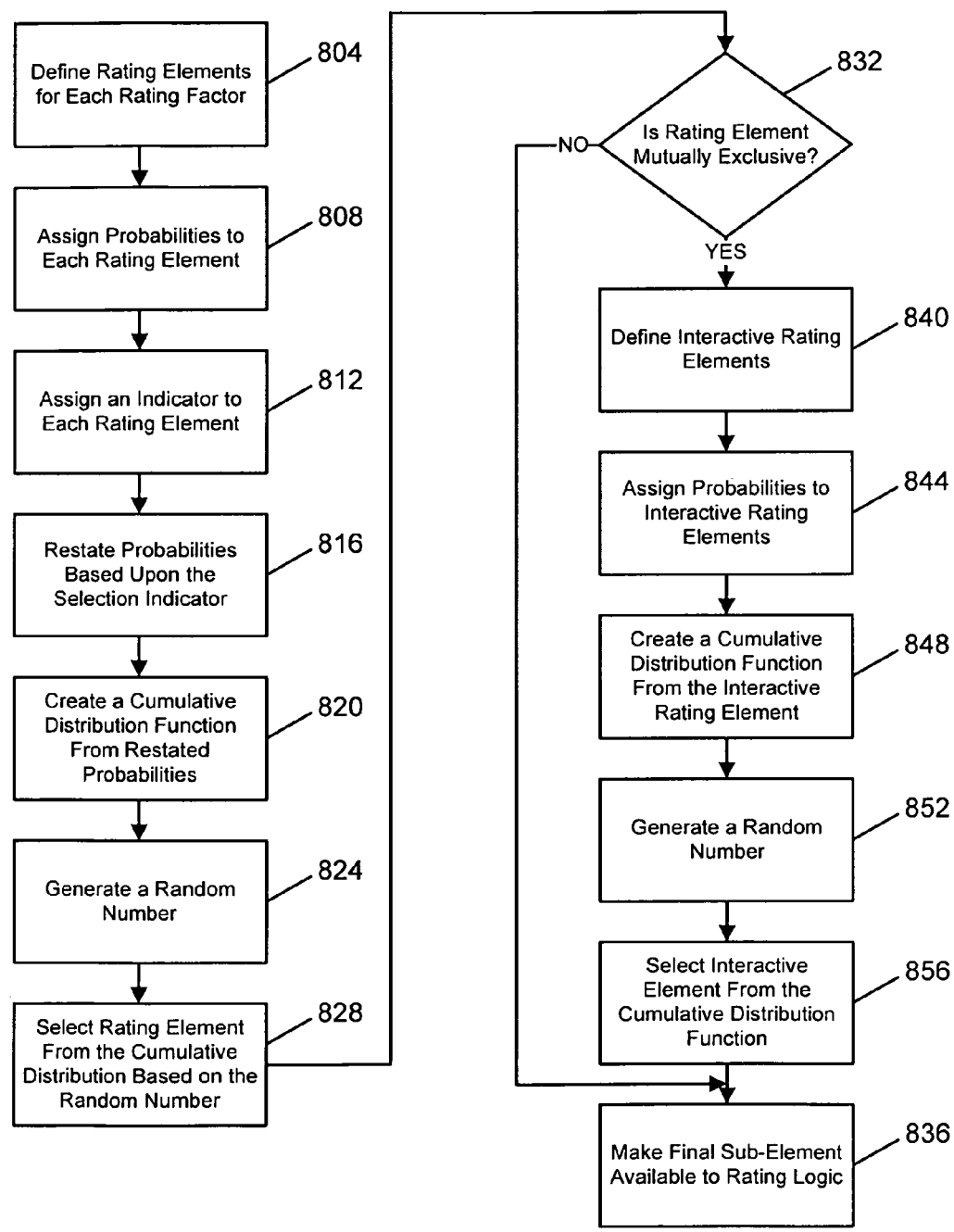
FIG. 8 is a flowchart of an insurance rate comparison method according to an embodiment of the present invention.

FIG. 8 shows a randomization flowchart 800 which provides an example of a randomization process according to an embodiment of the present invention. The process 800 begins in block 804 with defining or selecting rating elements for each rating factor. The rating elements are the various values that each rating factor can have. For example, if the rating factor is the combined single limit, the rating elements can include no coverage ("NoCov") and limits of 50, 75, 100, 250, 300 and 500 (in thousands of U.S. dollars). The rating elements can be state dependent, with each state having its own specific limits. After the rating elements have been defined, an initial probability can be assigned in block 808 to each of the selected rating elements. As discussed above, these initial probabilities can be selected by a user to mirror real world probabilities or any distribution of existing or potential insurance customers desired. For example, the probability of a 100/300 limit being selected can be given a much greater weight than that of a 25/50 limit.

In block 812, one or more rating elements can be selected by a user (e.g., on the randomization interface screen 400 as described above) in one or more of the rating factors. Those rating elements selected can be highlighted or can otherwise be given an indictor by the processor 30. The rate comparison module 100 determines which rating elements will be included in the randomization calculation process by using only those rating elements selected by the user. If the user does not select any rating element in a rating factor, the rate comparison module can use all rating elements, as indicated earlier.

In some embodiments of the present invention, if less than all rating elements for a rating factor are selected or are otherwise employed in the randomization process, the probability distribution of the rating elements can be adjusted accordingly (i.e., so that the probabilities for each rating element selected or otherwise employed add up to 100%). This step takes place in block 816 of the embodiment illustrated in FIG. 8. For example, if the probability distribution of uninsured motorist protection amounts is 1%, 10%, 5%, 15%, 5%, 34% and 30% for protection amounts of $0, $50,000, $75,000, $100,000, $250,000, $300,000, and $500,000, respectively, and that limits of $50,000, $75,000 and $250,000 are not selected for a randomization sampling, the rate comparison module 100 calculates the sum of the selected probabilities as 80% (1%+15%+34%+30%). To restate the probability distribution, the rate comparison module 100 can divide each selected probability by the sum of the selected probabilities. Therefore, the restated probability of no coverage will be 1.25%, and the restated probabilities of the limits of $100,000, $300,000 and $500,000 are 18.75%, 42.5% and 37.5% respectively. Note that the sum of the restated probabilities is 100%.

With reference to block 820 in FIG. 8, in some embodiments the probabilities of the rating elements selected (or to otherwise be employed) are used to prepare a cumulative probability distribution that can be compared to random numbers generated by the rate comparison module 100. In other words, the rate comparison module 100 can randomly generate a number (e.g., a number between 0 and 99) that will be compared to the selected rating elements and their respective distributions of a rating factor. The range of numbers from 0 to 99 corresponds to the selected rating elements in the rating factor. Accordingly, the random number generated corresponds to one of the selected rating elements (and its probability with respect to the other selected rating elements). By way of example, and using the exemplary restated probabilities mentioned in the previous paragraph, the rate comparison module 820 can assign a range of probabilities from 0-99 based upon the restated probabilities. The rate comparison module 100 could therefore assign 0 for no coverage, 1-19 for a $100,000 of coverage, 20-62 for $300,000 of coverage, and 63-99 for $500,000 of coverage. A number between 0 and 99 randomly generated by the rate comparison module (see block 824 in FIG. 8) will therefore have an appropriate probability of producing each limit. One having ordinary skill in the art will appreciate that the manner described above for assigning probabilities to rating elements in one or more rating factors and for selecting rating factors according to their assigned probabilities is one of several that can be employed by the rate comparison module to perform the same task. Probability assignments and random number generation can be carried out in any other manner (e.g., uniform distribution for random number generation), each one of which falls within the spirit and scope of the present invention.

With reference again to the exemplary method illustrated in FIG. 8, a rating element from the cumulative distribution corresponding to the random number generated by the rate comparison module is selected in block 828. For example, if the random number is 17 or 17% distribution in the example discussed above, the rating element $100,000 (which has a 19% distribution) is selected since it falls within the range of 1-19.

If the rating factor is mutually exclusive, which is decided in block 832, the process goes to make the rating elements available to the rating logic in block 836. If the rating factor is not mutually exclusive, the non-mutually exclusive rating factors are defined in block 840. Probabilities are then assigned to these non-mutually exclusive rating factors in block 844. Similar to treatment of the rating element probability distribution, a cumulative probability distribution function is generated from the rating factor probabilities in block 848. Thereafter, a second random number is generated in block 852. The rating factor distribution corresponding to the second random number is selected in block 856. The process then goes to make the rating elements available to the rating logic in block 836.

As described in greater detail above, the results of the randomization process can be summarized on the random tab 132 of the rate comparison user interface screen 34 (see FIG. 7A), although the results can be displayed or presented in any other manner desired as also described above. If an output file has been created, some embodiments of the present invention enable the user to view detailed results of the randomization process.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A computer-implemented method of comparing insurance premiums of at least two insurance companies, comprising:
   providing a plurality of rating factors, each of the rating factors at least partially defining a risk, each of the rating factors having at least two possible values;
   generating at least one random number via a processor;
   repetitively generating at least one of the possible rating factor values for each of the plurality of rating factors based on at least one random number generated by the processor;
   generating a plurality of entities representing parties to be insured, each of the entities defined at least in part by the generated rating factor values, and is independent from another one of the entities;

retrieving premium calculation data of a first insurance provider from a memory coupled to the processor;

calculating a premium of the first insurance provider, the premium of the first insurance provider at least partially based upon the premium calculation data of the first insurance provider and the generated plurality of entities;

retrieving premium calculation data of a second insurance provider from a memory coupled to the processor; and calculating a premium of the second insurance provider, the premium of the second insurance provider at least partially based upon the premium calculation data of the second insurance provider and the same generated plurality of entities used to calculate the premium of the first insurance provider.

2. The method of claim 1, further comprising displaying the premiums upon a display.

3. The method of claim 1, further comprising:

changing the rating factor;

generating at least one second random number via the processor;

repetitively generating at least one of the possible rating factor values for each of the plurality of rating factors based on the at least one second random number generated by the processor;

generating a second plurality of entities representing parties to be insured, each of the second entities defined at least in part by the rating factor values generated based on the at least one second random number, and is independent from another one of the second plurality of entities;

calculating a second premium of the first insurance provider, the second premium of the first insurance provider at least partially based upon the premium calculation data of the first insurance provider and the generated second plurality of entities corresponding to the second random number; and calculating a second premium of the second insurance provider, the second premium of the second insurance provider at least partially based upon the premium calculation data of the second insurance provider and the same generated second plurality of entities corresponding to the second random number.

4. The method of claim 1, further comprising:

receiving from a user a probability for the generated plurality of entities at a user interface screen; and assigning the probability to the generated plurality of entities.

5. The method of claim 1, further comprising:

receiving from a user a number of risks to run input into a user interface screen; and repeating the generating a random number, generating at least one of the possible rating factor, and calculating acts for each risk in the number of risk input by the user.

6. The method of claim 5, further comprising:

calculating at least one of an average and a sum of the premiums for the first insurance provider; and calculating at least one of an average and a sum of the premiums for the second insurance provider.

7. The method of claim 1, further comprising receiving from a user policy data input into a user interface screen; the premiums of the first and second insurance providers at least partially based upon the policy data.

8. The method of claim 1, wherein the rating factor is data corresponding to at least one of a vehicle and a driver.

9. The method of claim 1 further comprising ranking the premiums according to insurance provider.

* * * * *